(12) United States Patent
Fuchs

(10) Patent No.: US 6,970,833 B1
(45) Date of Patent: Nov. 29, 2005

(54) INTERNET LOTTERY METHOD AND SYSTEM

(76) Inventor: Steven Fuchs, 18769 Nathans Pl., Gaithersburg, MD (US) 20886

(*) Notice: Subject to any disclaimer, the term of this patent is extended or adjusted under 35 U.S.C. 154(b) by 841 days.

(21) Appl. No.: 09/642,697

(22) Filed: Aug. 7, 2000

(51) Int. Cl.[7] ............................... G06F 157/00
(52) U.S. Cl. ............................ 705/14; 463/41
(58) Field of Search ............... 463/41, 46, 40; 705/26, 7, 14

(56) References Cited

U.S. PATENT DOCUMENTS 5,791,991 A * 8/1998 Small .................. 463/41
6,061,660 A * 5/2000 Eggleston et al. ........... 705/14

* cited by examiner

Primary Examiner—John Leonard Young
(74) Attorney, Agent, or Firm—Cozen O'Connor; Michael B. Fein

(57) ABSTRACT

The present invention provides a game system which utilizes Web sites and thus is solely an Internet based patent. The system provides an individual with the ability to win prizes, view companies Web sites, and play games/lotteries such as a monopoly game board. This system stores the data received from the customers in an encrypted database and uses is it to determine customer preferences and geographies. The invention provides companies with useful information regarding their customers and each of their preferences.

17 Claims, 8 Drawing Sheets

The seven lines below are all that a website will need to add in order for the gamepiece generator.

<+HTML>

<BODY>

<applet code+"www.game.com\gamepieceGenerator.class" width 200 height 100

<param name=URL value="www.McDonalds.com">

</applet>

</HTML>

</BODY>

INTERNET LOTTERY METHOD AND SYSTEM

BACKGROUND OF THE INVENTION

The present invention relates to systems and methods for obtaining information about prospective customers using a computer system over the Internet. More particularly the invention relates to using a Web server to determine individual game player's product and service preferences. The invention also relates to targeted advertising.

Current Internet advertising systems display banner advertisements to lure a customer to an advertisers' Web site, the Double Click system being well known. Internet lottery and game systems are also well known, and usually operate by offering prizes such as money or objects but derive revenue by sale of advertising in the customary banner-ad way. Many companies use gameboard advertising wherein the customer receive a game piece when he visits the store or buys a product, and is awarded a prize if all of the appropriate game pieces are collected. To date, no one has offered a virtual gameboard advertising system where games pieces are collected by visiting Web sites.

It is an object of this invention to provide an improved advertising systems employing games and game pieces which can be implemented via the Internet.

It is a further object to provide a system and method of automatically obtaining potential customer identity and preferences using a Web site game.

SUMMARY OF THE INVENTION

These objects and others will become apparent from the following disclosure and are obtained by the present invention which comprises in one aspect a method for obtaining information about prospective customers, comprising:

A. providing a Web site which includes a game with a chance of winning prizes and includes advertisements which, when selected, link to a Web site describing an advertised product or service;

B. providing a system by which an individual can select desired prizes at the Web site; and C. storing information regarding the individual and the individual's desired prizes.

In another aspect, the invention comprises a system for obtaining, storing, and using prospective customer information to determine individual preferences and demographics comprising:

A. A computer providing a Web site containing a game, an advertisement for product or service, and including a chance to win a product or service for free;

B. A system for allowing an individual to select a desired product or service prize and for storing demographic information about the individual and prizes that individual has selected.

The present invention offers customers a free chance to win a company's product or service while customers view a company's advertisements as part of the game. The method integrates a game and a marketing tool in order to give customers entertainment and businesses access to their customers.

The customer can get to a Web site and receive a game piece by going to the 'my' server web page which is controlled by the master server. From this main server the customer can view the game board, and see which game pieces he/she has and which game pieces he/she still needs. By clicking on a game piece spot on the game board, it will enable a hyperlink to take them to the specific Web site that doles out that game piece.

This method for obtaining consumer information is extremely advantageous for the product manufacturers as well as those in related industries, in that they will be able to target and customize their products in accordance with the data and preferences received. The disadvantages of the current lotteries are solved by the present invention.

Customers will only have to enter his or her private information once. The customer will be assigned a unique ID, which could be an email address, and it will be stored as a cookie on the customer's computer. This ID can be automatically retrieved so the customer can be validated on each re-occurring visit. If the customer can not be validated they can manually enter his or her email address.

Companies benefit by advertising products to the customers, and the customers benefit by receiving a chance to win a product or service for free. The ability to integrate graphical advertisements with this invention provides a high certainty that customers will view the advertisements. The method lets the customer select the items to play for, thus enabling tracking of the customer interests. The customer gets to specify only the items of interest and ignore the rest. Also, the customer must enter an advertiser's Web site in order to receive a game piece that is necessary to play the game. The game piece generator program is a single action program meaning that a single click is needed to trigger the generation of a game piece. The master server could be done away with if every site maintained their own database and shared with the other sites; but a master server is the best way as it is centralized and can be administered easiest. The method causes customers to come directly to the companies' web sites to with the prizes, so the number of hits or internet traffic will go up.

Through this system, a master server can track customers and can also lift the work off the Web sites by letting them use custom software. This ensures a consistent and secure behavior on all Web sites. By putting the game board on the Web site in the main server, the system can securely and safely show the customer what game pieces they have and cut down on the ability to alter or cheat. The system also controls what advertisements are displayed on the game board and can restrict the customer from viewing other customer's game pieces. The customer will always see the same display, program, etc., no matter what Web site they visit. This will prevent the customer from becoming confused. The master server does not dole out game pieces, which forces customers to visit companies Web sites if they want to win a prize. Most Web sites direct or push customers to a Web site. This systems novel approach is to freely let the customer do whatever he/she desires. This will enable genuine tracking based on sincere customer interest.

This invention stores the winners in a file, database, or anything with storage ability, which can also be in encrypted format for added privacy and security. The game piece generator program sends enough information for the master server to know which player is sending the request, and from which site, but limited amount of personal information so anyone intercepting the request would get very little use from this information. Customers do not have to pay anything, and the company receives inexpensive advertising. The method enables the gathering of marketing information that is invaluable to businesses who want to know their customers interests. By letting the customer freely choose game pieces, the system can inform businesses about their customers and how to better their existing products.

Web sites can customize the client side game piece generator while still keeping the same look and feel so that players know that it is the game. Pictures, logos, and text can be added simply without changing the look and feel or the basic framework of the game.

The present invention can also limit the number of times a customer plays, or the number of prizes a customer wins by checking the email address or other information such as Internet Protocol (IP) address. The customer can only receive one game piece per day. This could be altered to any desired amount, but one is the recommended amount.

Distributing the game across multiple Web site's, thereby breaking up the game into pieces, creates a unique process with many advantages. First, if some Web sites are down or unreachable, others will be up and usable so the game will still be playable. And second, the computer utilization and bandwidth is spread across multiple Web sites, thus increasing the overall efficiency of the game. By using distributive architecture, an almost infinite number of web sites are able to join and share in the benefits of the invention. Each web site can be a game unto itself, independent of other web sites, so any time another web site is added to or removed from the game, playability is not altered.

The utilization of web sites through marshalling techniques provides real time transparent integration of companies web sites with a master server in a transparent fashion in that the user really does not know that the web site is communicating with a master server.

There will be different odds of winning for different products. One product may have a 1 in 1,000,000 chance of winning, while another product may have a 1 in 10,000 chance of winning depending on the amount of products to be won, and the cost of the product.

Also, this system is an instant win and notification method. The customer will know within seconds what game piece they received and can view their current game pieces. If the customer wins a product by collecting all related game pieces, the main server will send them notification via email or some similar method.

BRIEF DESCRIPTION OF THE DRAWINGS

The figures depict a preferred embodiment of the present invention for purposes of illustration only. One skilled in the art will readily recognise from the following discussion that alternative embodiments of the structures and methods illustrated herein may be employed without departing from the principles of the invention described herein.

FIG. 5 is an illustration of the seven lines that an advertisers' Web site will need to add in order to activate the game piece generator program.

DETAILED DESCRIPTION OF THE DRAWINGS

The figures depict a preferred embodiment of the present invention for purposes of illustration only. One skilled in the art will readily recognize from the following discussion that alternative embodiments of the structures and methods illustrated herein may be employed without departing from the principles of the invention described herein.

Figure 1:
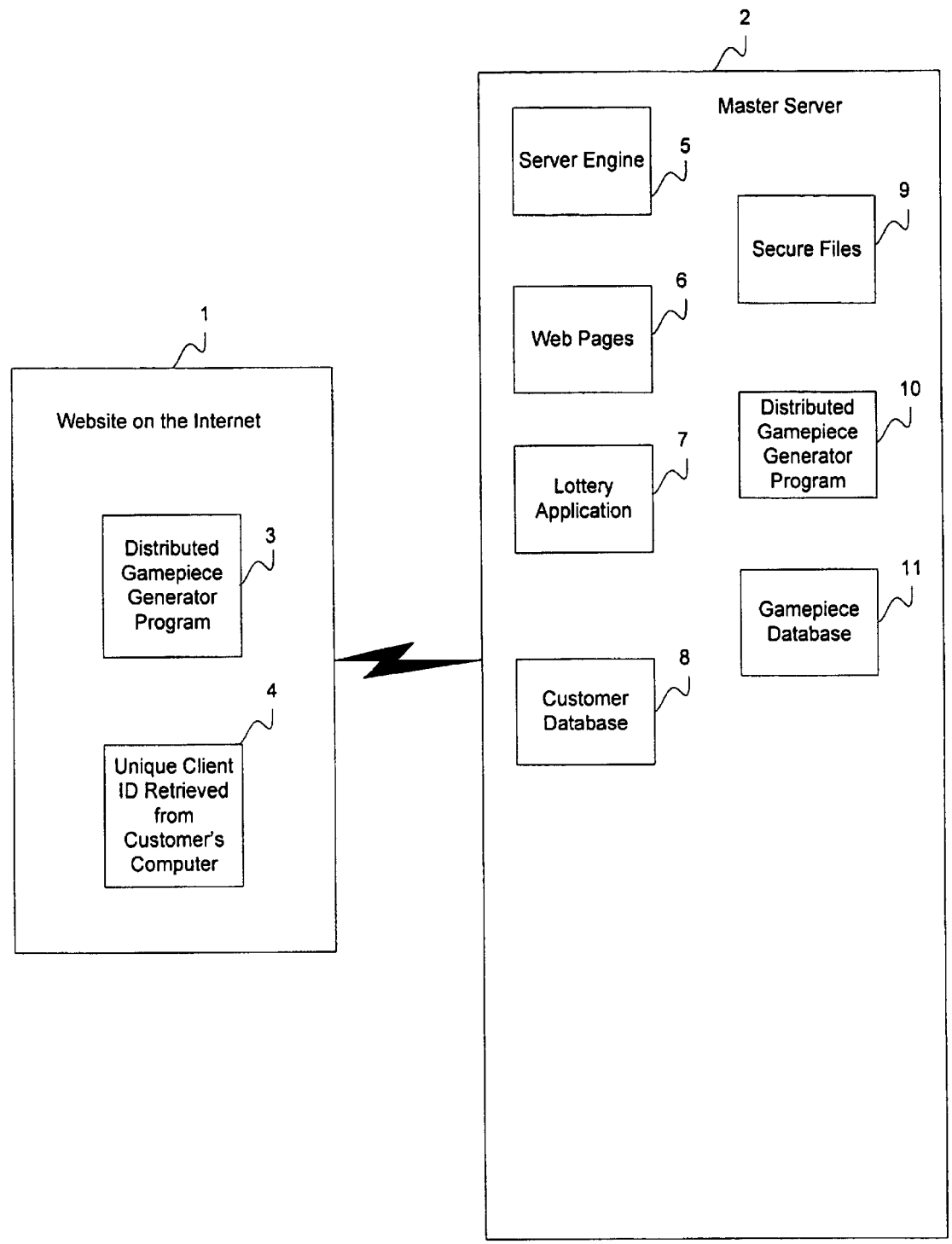
FIG. 1 is a block diagram illustrating the connection between the Web site on the Internet and the master server.

FIG. 1 is a block diagram illustrating the connection between the Web site on the Internet 1 and the master server 2. The Web site 1 is comprised of two main programs. The distributed game piece generator program 3 consists of generating and distributing game pieces to the customer when they click on a specific advertisement. By going to the advertiser's web page, they are able to get a game piece which is necessary to play the lottery games in order to win that specific prize. The second component of the Web site 1 is the unique client ID retrieved from the customer's computer 4. This unique ID is assigned to a customer after they input their name, email address, and other optional information. This ID can be retrieved at any time so the customer can be automatically validated upon each visit to the Web site 1.

The master server 2 consists of seven main components. The server engine 5 is the network that provides for this Web site 1 (computer, etc . . . ). The web pages 6 are what the customer looks at and scrolls through when they enter this Web site 1. The web pages 6 give directions for the customer, displays advertisements, and provides games. The lottery application 7 is what the customer fills in upon their first visit to the Web site 1. The customer gives their name, email address, and possibly some other information. This step is required before the customer can use the Web site 1 to-play any of the games. The customer database 8 takes the provided information and stores it in the database 8. This database 8, through the master server 2, can track customers and can also lift the work off the Web sites 1 by letting them use custom software. This enables the customer database 8 to analyze and determine customer preferences thus providing businesses with information about their customers' preferences. The master server 2 stores the customers information in secure files 9 which can be in encrypted format for added security. The distributed game piece generator program 10 forces the customer to visit another companies Web site in order to receive a game piece that is needed to play the games on the present invention. Then, with this game piece, the customer can play various games/lotteries attempting to win the specific prize on the game piece they have received. The game piece database 11 stores all of the information received from the distributed game piece generator program 10.

Figure 2:
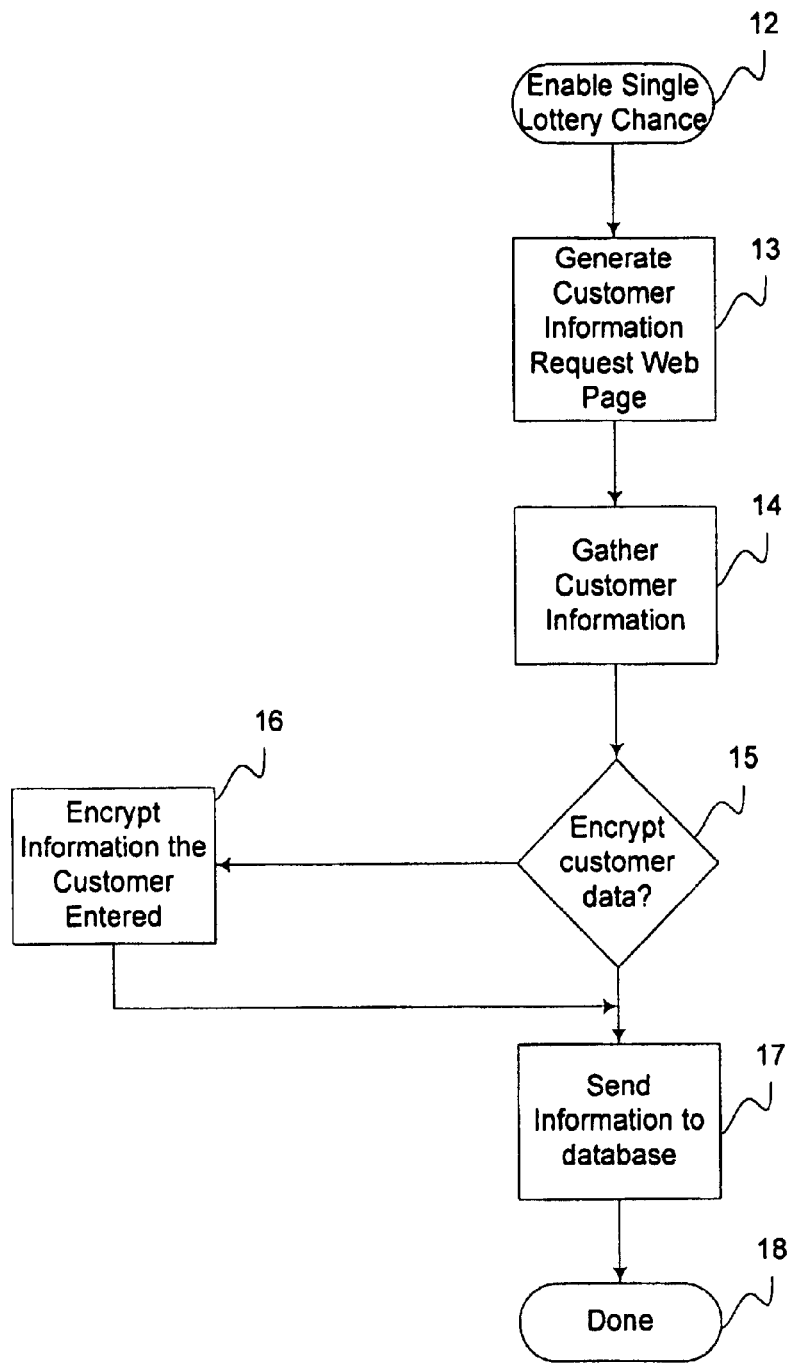
FIG. 2 is a flowchart illustrating how the Web site stores and encrypts individuals' information.

FIG. 2 is a flowchart illustrating how the Web site stores and encrypts customer information. The first step requires the master server 2 from FIG. 1 to enable the single lottery chance 12. The master server 2 will then generate the customer information request page 13.

This requires the customer to enter certain information (name, email address) and gives them the option to enter other information. The master server 2 then gathers the information 14 and can encrypt the data 15 for added security. After encrypting the information that the customer entered 16, the master server 2 will send this information to its database 17 to be stored and analyzed as needed. This completes the storing and encrypting of customer information 18.

Figure 2A:
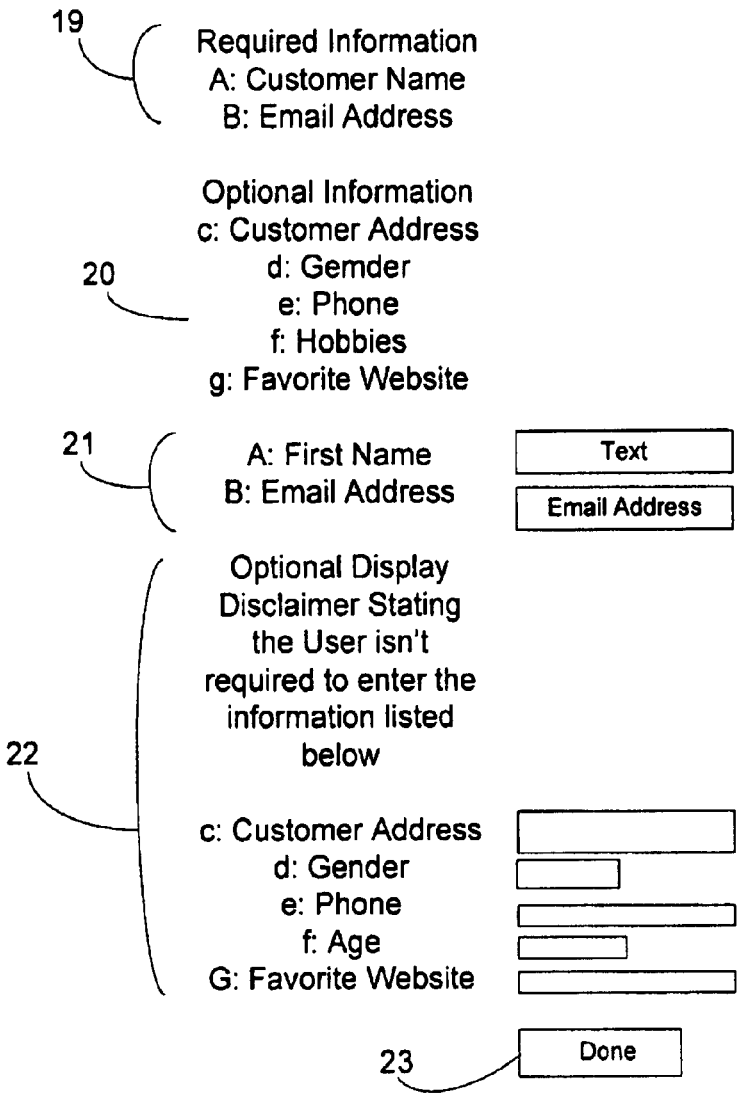
FIG. 2a is a diagram illustrating a selection screen in which an individual must input certain required information and may input certain optional information.

FIG. 2a is a diagram illustrating a selection screen in which a customer must input certain required information and may input certain optional information. The customer, when first entering this Web site 1, will be required to input certain information about themselves. The selection screen they will encounter is displayed in FIG. 2a and is a detailed description of the customer information request page 13 of FIG. 2. First, the customer will have to input certain required information 19 consisting of the customers name and email address. Secondly, the customer may fill in certain optional information 20 consisting of their address, gender, phone, hobbies, and favorite Web site. The customer will be given boxes in which they will enter their name and email address 21. Lastly, there will be an optional display disclaimer stating the user isn't required to enter the information listed below 22 consisting of the five options previously listed. Then the customer is done 23 and will receive a unique client ID. The game piece generator program 10 sends enough information for the master server 2 to know which player is sending the request, and from which site, but limited amount of personal information so anyone intercepting the request would get very little use from this information.

Figure 3:
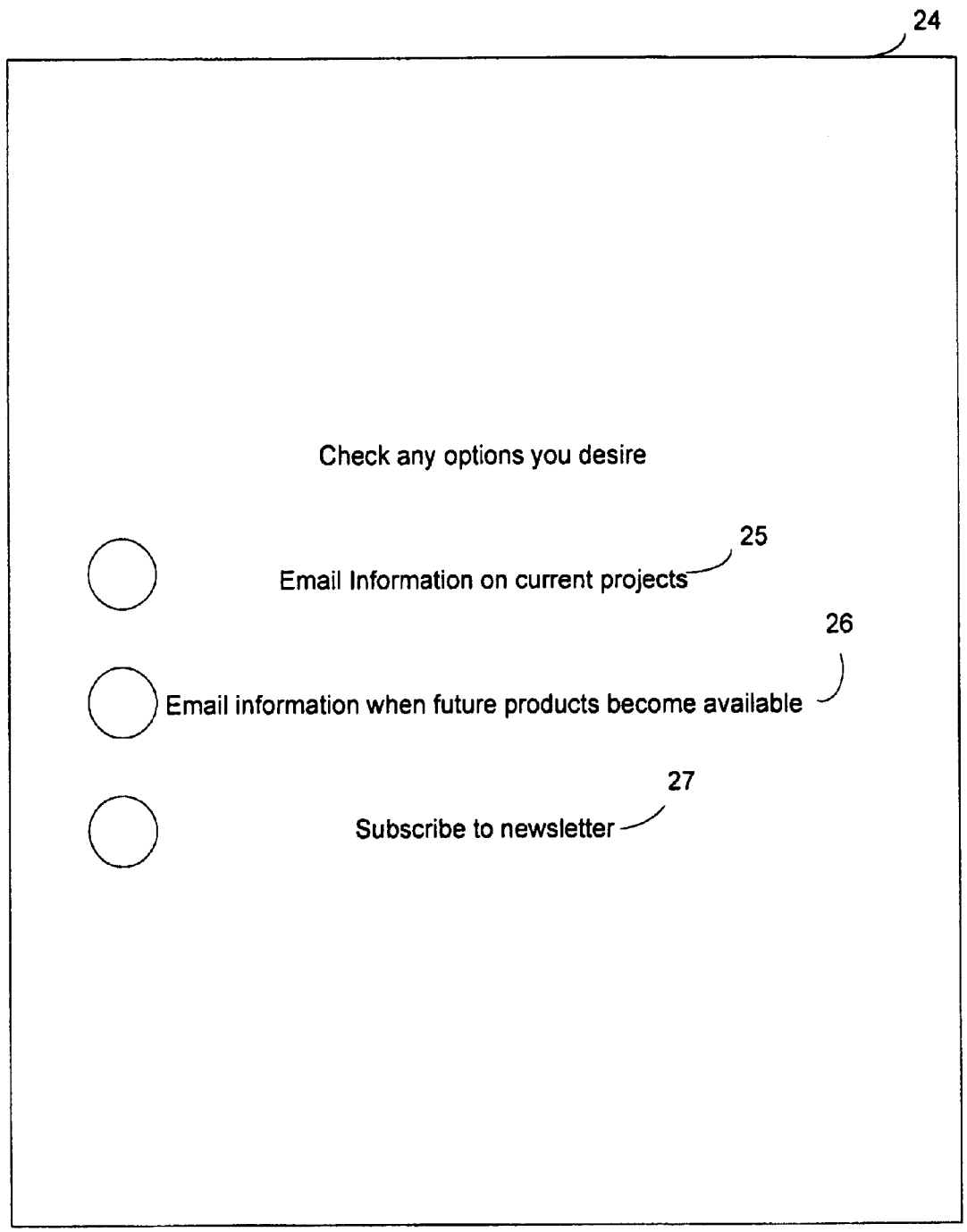
FIG. 3 is a diagram illustrating a selection screen giving the individual options.

FIG. 3 is a diagram illustrating a selection screen 24 giving the individual options. The customer can click on any of the desired options he or she so chooses such as: email information on current products 25, email information when future products become available 26, and subscribe to newsletter 27.

Figure 4:
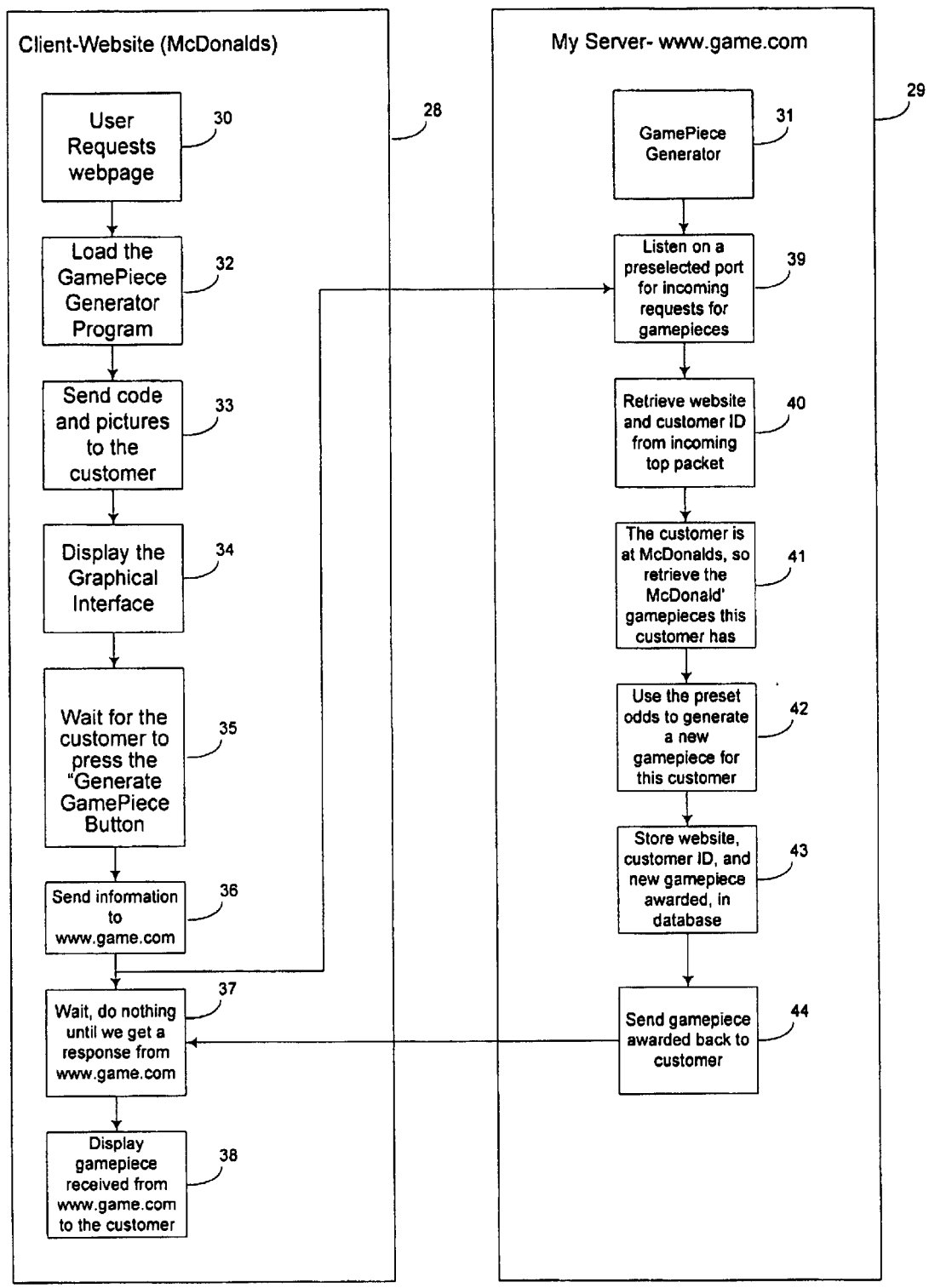
FIG. 4 is a flowchart illustrating a first embodiment of the game piece generator program that is illustrated in FIG. 1.

FIG. 4 is a flowchart illustrating a first embodiment of the game piece generator program that is illustrated in FIG. 1. The client-Web site 28 used in this first embodiment is McDonalds. While using the present inventions Web site 1, the customer requests a web page 30 such as McDonald's. By requesting the web page, the master server 2 will load the game piece generator program 32 into that Web site so long as that Web site is equipped with the requisite code. The client Web site 28 will send code and pictures to the customer 33 enabling them to view the various elements of the requested web page through the graphical interface 34. The program will then wait for the customer to click on the 'generate game piece button' 35. Once the customer clicks on this button, McDonald's Web site will send information to www.game.com 36, which is the address of the present invention's server. This, in turn, will activate the game piece generator 31 as this generator was listening on a pre-selected port for incoming requests for game pieces 39. The game piece generator 31 will retrieve the Web site and customer ID 40. The generator will discover that the customer is at McDonalds' Web site and will then retrieve the McDonald game pieces this customer has 41. The game piece generator 31 will use the preset odds to generate a new game piece for this customer 42. The generator will then store the Web site, customer ID, and new game piece awarded in the database 43 for future usage. The generator then sends the game piece awarded back to the customer 44. In the meantime, the client Web site 28 has waited until it got a response from www-.game.com. 37. Once www.game.com is finished, the client Web site 28 will display the game piece received from www.game.com to the customer 38.

Figure 4A:
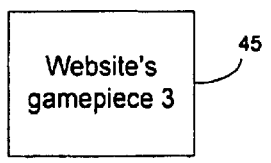
FIG. 4a illustrates the Web site's game piece.

FIG. 4a illustrates the Web site's game piece. This is a representation of the game piece 45 a customer receives after completing the steps of FIG. 4.

FIG. 5 is an illustration of the seven lines 46 that an advertisers' Web site will need to add in order to activate the game piece generator program.

Figure 6:
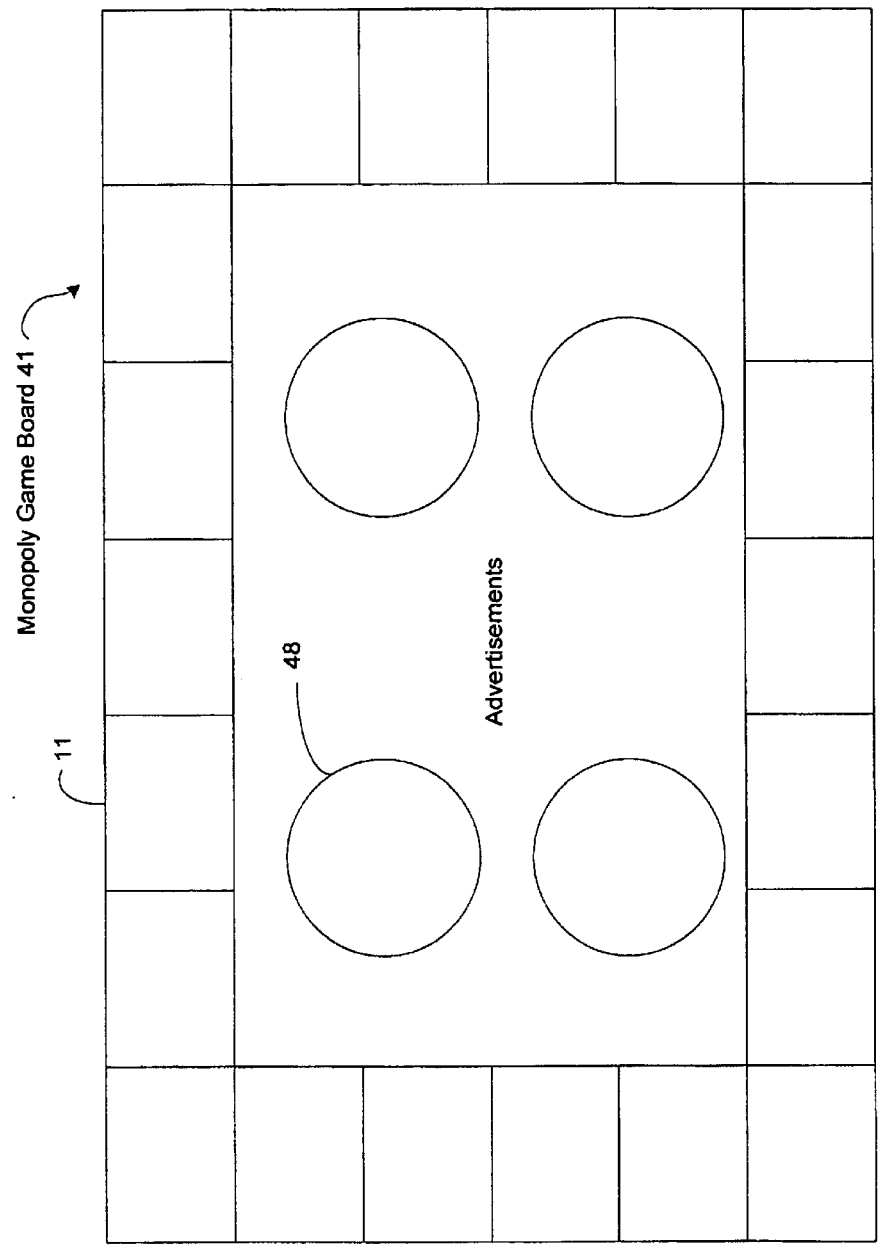
FIG. 6 is a flowchart illustrating the preferred embodiment of the game (monopoly game board).

FIG. 6 is a flowchart illustrating the preferred embodiment of the game (monopoly game board). The monopoly game board 47 is the preferred embodiment because advertisements 48 can be put in the middle and the game board spots 49 can be either in a square, circle, or some polygon format around the middle. Each game board spot 49 will have a picture on it. A colored picture means the customer has that piece. On the other hand, a watermark, black and white, picture means the customer needs the game piece. Each spot on the game board 49 has a hyperlink to take the customer to the web page that has that game piece generator.

Each picture of an advertiser's product or service is associated with a URL (Uniform Resource Locator) which when clicked by the user will take the user to a description of the product or service for sale so the user may purchase the product or service. The game board can have any appearance, but the recommended board would look like the monopoly game board 47.

The foregoing discussion discloses and describes merely exemplary embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

What is claimed is:

1. A method for obtaining information about individual prospective customers, comprising:
   A. providing a game Web server and plurality of Web sites including a first Web site which includes a game and a plurality of customer-selectable prizes which, when selected, redirect the customer to an advertiser Web site which describes the selected prize and includes a game piece generator which, upon selection, randomly generates a figurative game piece which can be used in the game at the first Web site by sending information to the game Web server
   B. storing information regarding the prospective customer and the prospective customers selected prizes at the game Web server.

2. The method of claim 1 wherein the individual is requested to provide their name and e-mail address before entering the game.

3. The method of claim 2 wherein the individual's name and e-mail address are stored in a database to aid in determining customer preferences and demographics.

4. The method of claim 3 wherein the database stores the information in a file in an encrypted database for added security.

5. The method of claim 1 wherein the advertisements include a picture of an advertiser's product and the advertisement is associated with a URL (Uniform Resource Locator) for a Web site which describes the product or service for sale and allows the individual to purchase the product or service.

6. The method of claim 1 wherein the individual selects a product or service prize they would like to play for.

7. The method of claim 1 wherein the individual may collect a game piece at the second Web site through a game piece generator program which includes a random selection feature.

8. The method of claim 1 wherein the second Web site is selected based on factors comprising the individual's prior selection history.

9. The method of claim 8 wherein the system customizes the advertisements based on personal information on the individual.

10. The method of claim 2 wherein the individual which is a winner is contacted through the e-mail address that the individual supplied before playing the game.

11. The method of claim 10 wherein an advertiser may retrieve the e-mail addresses of all the individual's that played the games, viewed their advertisements, or was redirected to the advertiser's associated URL.

12. The method of claim 11 wherein the advertisers offer the individual coupons, discounts, or other incentives to purchase the advertisers products or services.

13. The method of claim 2 wherein the database can limit the number of times an individual plays, or the number of prizes the individual wins by comparing the e-mail address or Internet Protocol (IP) address with existing records.

14. A system for obtaining, storing, and using prospective customer information to determine individual preferences and demographics comprising:
  A. a game Web server computer providing a game Web site containing a game and a plurality of selectable products or services including a chance to win a selected product or service for free;
  B. wherein the Web server computer is programmed to allow an individual prospective customer to select a desired product or service prize and to redirect the customer to a different Web site which describes the selected prize or service and includes a random game piece generator which, upon selection, randomly generates a figurative game piece which can be used in the game at the first Web site;
  C. the game piece generator sending information on the game piece generated for the individual customer which is in turn processed by the Web server to determine whether the customer has fulfilled the game piece requirements to win the game;
  D the Web server programmed to store demographic information about the individual and prizes that individual has selected.

15. The system of claim 14 wherein the individual enters the computer and redirects an individual to an advertiser's Web site corresponding to the prize selected by the individual.

16. The system of claim 15 wherein the individual's preferences and demographics are stored and processed.

17. The system of claim 14 wherein the individual choice as to which products to play for is processed as preferences and sold as sale leads:
  enabling the database to store such marketing information to inform companies about their individual's preferences.

* * * * *